2 Sheets—Sheet 1.
T. J. WATERS.
MACHINE FOR CUTTING SCREW-THREADS.
No. 184,563. Patented Nov. 21, 1876.
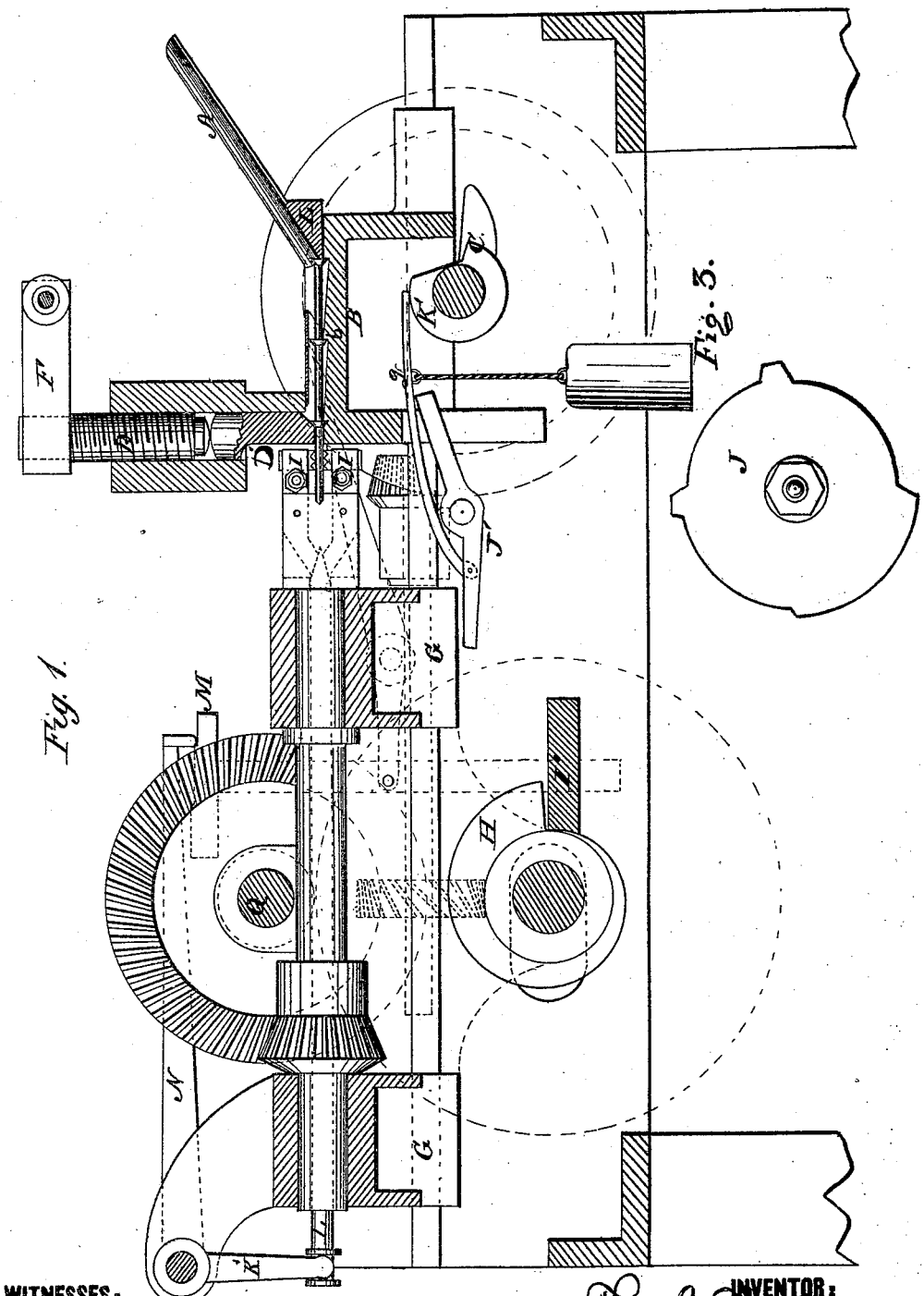
WITNESSES:
W. W. Hollingsworth
Chas. A. Pettit
INVENTOR:
Thos. J. Waters
BY
[signature]
ATTORNEYS.

T. J. WATERS.
MACHINE FOR CUTTING SCREW-THREADS.
No. 184,563. Patented Nov. 21, 1876.
2 Sheets—Sheet 2.
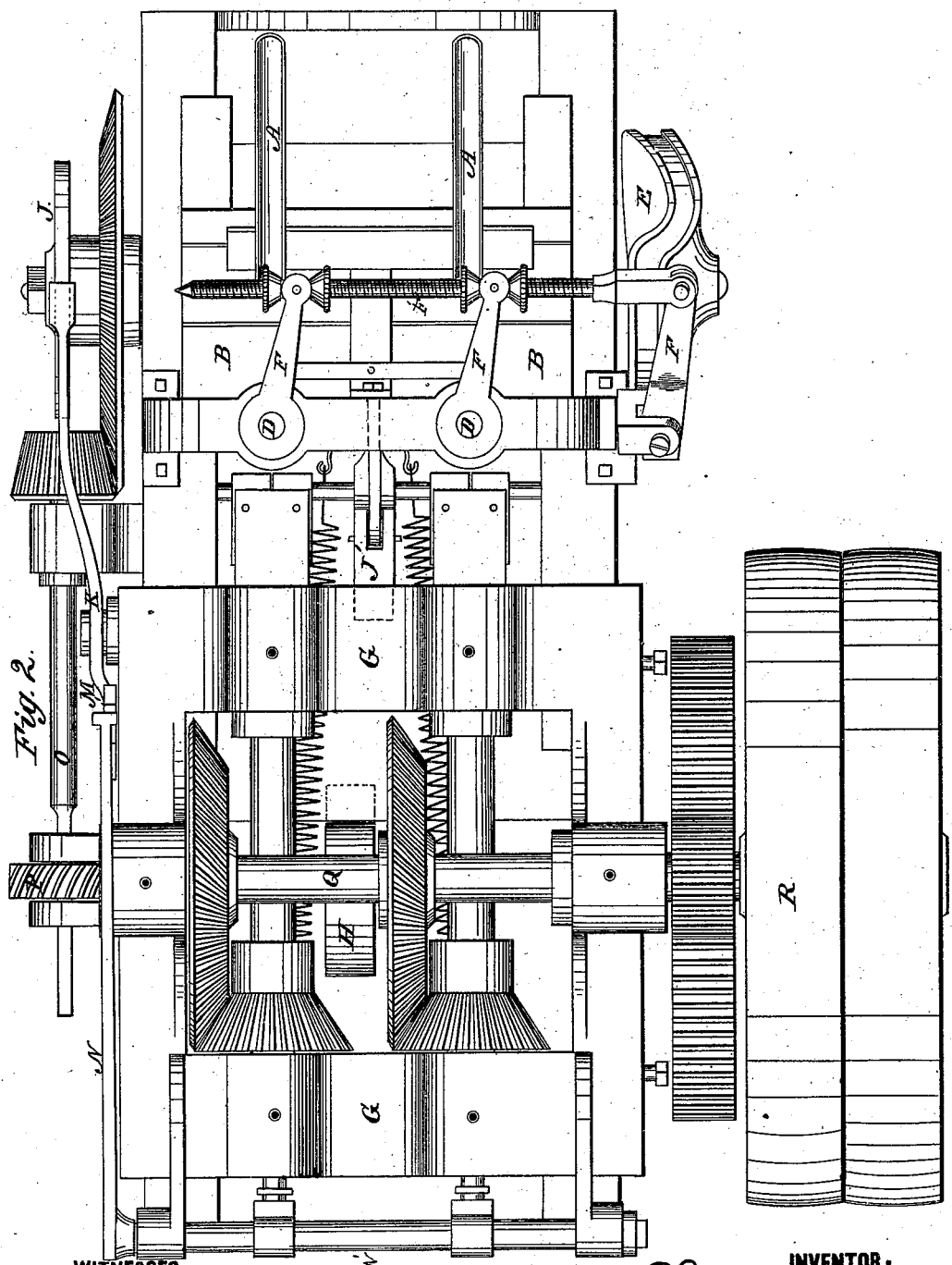
WITNESSES:
W. W. Hollingsworth
Chas. A. Pettit
INVENTOR:
Thos. J. Waters
BY
ATTORNEYS.

UNITED STATES PATENT OFFICE.

THOMAS J. WATERS, OF LONDON, ENGLAND.

IMPROVEMENT IN MACHINES FOR CUTTING SCREW-THREADS.

Specification forming part of Letters Patent No. 184,563, dated November 21, 1876; application filed September 1, 1876.

*To all whom it may concern:*

Be it known that I, THOMAS JAMES WATERS, of 31 St. Stephen's Road, Bayswater, London, in England, civil engineer, have invented a certain Machine for Cutting Threads on Screws, of which the following is a specification:

Figure 1 is a sectional elevation of this machine. Fig. 2 is a plan of the machine. Fig. 3 is a side view of the cam for working the cutters.

The machine consists of a framing or bed-plate carrying two sliding tables. One of these tables carries one or more revolving spindles having cutters at its or their ends for cutting the threads on the blanks, while the second table holds the blanks while having the thread cut on them. This table is made to slide under fixed hoppers, through which the blanks are fed onto the table, and, after having the threads cut on the blanks, they are discharged into a receptacle for them.

The operation of the machine is as follows: The blanks, having the heads made in any usual manner, are fed into the hoppers A A, from which they slide onto the table B, on which are made grooves to receive them. These grooves are so shaped that the blanks rest each with its head against a shoulder-band, and can be pushed forward, but cannot be pushed backward. On the table B moving forward, it takes with it as many blanks as there are spindles in the machine, and places them under the holders D' and pinching-screws D. These screws are now lowered by means of the levers F, actuated by the cam E and screw F', so that the blanks are held firmly by their heads, as shown in Fig. 1. The sliding table G, carrying the revolving spindles and cutters, now comes forward; the cutters I, being open, allow them to pass over the end of the blanks to be threaded. The table G is now drawn slowly back by means of the cam H, while, at the same time, the revolving cutters I close on the blanks to be threaded. This closing and opening of the cutters is effected by the cam J acting on the levers K K. These levers, by pushing forward and drawing back a rod passing through the revolving spindle, opens and closes the jaws carrying the cutters I I. As these cutters, while revolving, and at the same time being drawn back, cut into the blanks, they necessarily cut a spiral on its surface. The cam H is so arranged that it makes four revolutions to one of the cam C. By these means the blank receives three cuts from the revolving cutters I I. When the cam C draws back, the sliding table B allows the finished screw to fall, (by the table being drawn from under it;) and the table being drawn still farther back, a new blank falls into the place lately occupied by the completed screw. The table then comes forward, bringing with it the new blank, which it places under the pinching-screw D, which descends on it, and holds it firmly, as before described, while the sliding table G, with the revolving spindles and cutters, comes forward and cuts the thread on it.

In the accompanying drawings, A A are the hoppers, into which the blanks are fed. B is a sliding table for bringing the blanks forward. C is a cam for moving the table B. D D are pinching-screws for holding the blanks while they are being threaded. E is a cam for working the screws D D. F F are levers connecting the cam E and the screws D D. G is a sliding table, carrying the revolving cutters. H is a cam for moving this table. I' is a stop, against which the cam H works. J is a cam for working the revolving cutters I I. The cam is made in three peripheral divisions of unequal depth, for the purpose of thrusting the wedge farther and closing the jaws more at each cut upon the blank. J' is a lever-catch, which is provided with a pivoted weighted arm, $g$, the latter bearing upon a cam, K'', arranged side by side with cam C. The cam K'' holds the arm $g$ elevated, and thus relieves the lever J' of the weight, except at one point, in its rotation. The lever J' is thus made to bear against the cutter-bed G, and hold it until, and release it when, the time comes for the next cut. K K are levers connecting the cam J with the cutters I I. L L are rods passing through the revolving spindles, and connecting the levers K with the cutters I. M is an intermediate piece, which rises and falls by the action of the cam J as the cutters I I are required to open or close. N is a lever, which is carried by the sliding table G, and moves backward and forward on the T-piece M, and as it rises and falls it opens or closes the cutters I I. On the head of the T-piece M are three steps, on which the end of the lever N slides, which adapt the rotary cutters of each spindle to blanks of varying size and diameter. O is a shaft for communicating motion to the cams C, J, and E. P is a pair of skew-wheels. Q is the driving-shaft. R is the driving-pulley.

I claim for my invention—

1. The combination, in a screw-threading machine, of a sliding bolt-blank carrier, B, and a blank-holder, D', with opening and closing cutters I, arranged to reciprocate and rotate, substantially as and for the purpose specified.

2. The cam E, screw F', and lever F, combined with screw D, blank-holder D', as and for the purpose set forth.

3. The combination of the lever N and the T-piece M with the sliding wedge-rod and cutter-jaws, as shown and described, to operate as specified.

The above specification signed by me this twenty-fourth day of May, one thousand eight hundred and seventy-six.

THOS. J. WATERS. [L. S.]

Witnesses:
T. MORGAN,
21 Cockspur Street, London, S. W.
JAMES JOHN LEWRY,
Clerk to Messrs. Comerford & Co.,
7 Tokenhouse Yard, London.